United States Patent
Leib et al.

(10) Patent No.: US 12,538,233 B1
(45) Date of Patent: Jan. 27, 2026

(54) WAKEUP MECHANISM FOR ENERGY EFFICIENT ETHERNET (EEE) WITH TIME-SENSITIVE COMMUNICATIONS

(71) Applicant: Marvell Asia Pte Ltd, Singapore (SG)

(72) Inventors: Zvi Shmilovici Leib, Tel Aviv (IL); Ragnar Hlynur Jonsson, Aliso Viejo, CA (US); Seid Alireza Razavi Majomard, Belmont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 352 days.

(21) Appl. No.: 18/142,449

(22) Filed: May 2, 2023

Related U.S. Application Data

(60) Provisional application No. 63/337,245, filed on May 2, 2022.

(51) Int. Cl.
*H04W 52/02* (2009.01)

(52) U.S. Cl.
CPC ..... *H04W 52/028* (2013.01); *H04W 52/0216* (2013.01)

(58) Field of Classification Search
CPC .......... H04W 52/028; H04W 52/0216
USPC ........................................ 370/318
See application file for complete search history.

(56) References Cited

U.S. PATENT DOCUMENTS 8,738,950 B2 * 5/2014 Cooper ............... G06F 1/3287
713/323

OTHER PUBLICATIONS

Kim et al., "Traffic Load-Based LPI Control Mechanism in Ethernet Access Network," Contemporary Engineering Sciences, vol. 7, No. 24, 2014, pp. 1373-1381.
Lynskey, "55.X Management Interface," available at https://www.ieee802.org/3/an/public/qu04/lynskey_2_0704.pdf, Jul. 2004 (6 pages)
"IEEE Std 802.3chTM-2020, Amendment 8: Physical Layer Specifications and Management Parameters for 2.5 Gb/s, 5 Gb/s, and 10 Gb/s Automotive Electrical Ethernet," The Institute for Electrical and Electronics Engineers (IEEE), Jun. 4, 2020 (207 pages).

* cited by examiner

*Primary Examiner* — Intekhaab A Siddiquee

(57) ABSTRACT

A communication device determines that a communication link will be used for a time-sensitive communication at a future time. In response to determining that the communication link will be used for the time-sensitive communication at the future time, the communication device transitions the communication link from a low power mode to a normal mode prior to the future time so that the communication link is in the normal mode when the future time occurs. The normal mode is for communicating packets via the communication link, and the low power mode reduces power consumption of the communication device as compared to the normal mode.

22 Claims, 4 Drawing Sheets

WAKEUP MECHANISM FOR ENERGY EFFICIENT ETHERNET (EEE) WITH TIME-SENSITIVE COMMUNICATIONS

CROSS REFERENCES TO RELATED APPLICATIONS

This application claims the benefit of U.S. Provisional Patent App. No. 63/337,245, entitled "Wakeup Command for Time Sensitive Application in Energy Efficient Ethernet (EEE)," filed on May 2, 2022, the disclosure of which is expressly incorporated herein by reference in its entirety.

FIELD OF TECHNOLOGY

This disclosure relates generally to network communications, and more particularly to power saving techniques for network communications.

BACKGROUND

The IEEE 802.3ch™ Standard, Institute for Electrical and Electrical Engineers (IEEE), pp. 1-207, Jun. 30, 2020 ("IEEE Std 802.3ch™-2020"), describes a feature, referred to as Energy Efficient Ethernet (EEE), that reduces power consumption during periods in which a transmitter does not need to transmit data to a receiver. For example, when the transmitter does not need to transmit data to the receiver via a communication link, the transmitter transitions the communication link from a normal operation mode to a low power idle (LPI) mode of operation. During the LPI mode, the transmitter and the receiver operate in a repeating quiet-refresh cycle in which the transmitter transmits nothing during periodic time periods (referred to as "quiet time periods"), and transmits refresh symbols during other periodic time periods (referred to as "refresh time periods"). Because nothing is transmitted during the quiet time periods, power consumption is reduced at the transmitter. Similarly, the receiver may also go to sleep during the quiet time periods to reduce power consumption. Transmission of the refresh symbols during the refresh time periods permits the receiver to maintain clock synchronization and to adapt filters (e.g., equalization filters) of the receiver.

The quiet-refresh cycle includes designated time windows (referred to herein as "alert windows") in which transmitter may transmit a signal (referred to herein as an "alert signal") to alert the receiver that the transmitter will soon transmit a request to exit the LPI mode (referred to herein as a "wake signal"). The transmitter is permitted to transmit the wake signal during any of the alert windows. When in the LPI mode, the receiver powers up to be prepared to receive an alert signal and/or a wake signal in any of the alert windows. The receiver is configured to transition from the LPI mode to the normal mode in response to receiving a wake signal during an alert window.

In a conventional communication device, the transmitter will determine that the communication link should be transitioned to the normal mode in response to the transmitter receiving a packet (e.g., from a host processor) that is to be transmitted via the communication link, for example. Because of the use of alert windows in EEE as discussed above, there is variable delay between when the packet is received by the transmitter and when the communication link is transitioned to the normal mode and ready to transmit the packet. For example, the delay will vary depending on how far in advance from the next occurring alert window the packet is received by the transmitter.

In at least some communication networks, such as automotive communication networks, industrial communication networks, etc., the timing of transmission of certain packets is important. For example, the precision to protocol (PTP) measures the transmit delay between two devices in a network and uses the delay for synchronizing clocks of the two devices. The variable delay caused by EEE may reduce the quality of the synchronization of the two clocks. As another example, some camera control commands in automotive networks are required to be delivered to a camera with a certain delay in between the commands, and the variable delay caused by EEE may adversely affect control of the camera.

SUMMARY

In an embodiment, a communication device for communicating in a communication network comprises: a transceiver configured to i) communicate via a communication link, and ii) selectively operate the communication link a) in a normal mode for communicating packets via the communication link, and b) in a low power mode that reduces power consumption of the transceiver as compared to the normal mode; and a controller configured to i) determine that the communication link will be used for a time-sensitive communication at a future time, and ii) in response to determining that the communication link will be used for the time-sensitive communication at the future time, transition the communication link from the low power mode to the normal mode prior to the future time so that the communication link is in the normal mode when the future time occurs.

In another embodiment, a method of operation in a communication network that is used for time-sensitive communications includes: determining, at a communication device, that a communication link will be used for a time-sensitive communication at a future time; and in response to determining that the communication link will be used for the time-sensitive communication at the future time, transitioning, by the communication device, the communication link from a low power mode to a normal mode prior to the future time so that the communication link is in the normal mode when the future time occurs, wherein the normal mode is for communicating packets via the communication link, and the low power mode reduces power consumption of the communication device as compared to the normal mode.

DETAILED DESCRIPTION

In some embodiments described below, a communication device determines that a communication link will be used for a time-sensitive communication at a future time, and in response transitions the communication link from a low power mode to a normal mode prior to the future time so that the communication link is in the normal mode when the future time occurs. In some embodiments in which the communication device uses the Energy Efficient Ethernet (EEE) mechanism defined by the IEEE 802.3 Standard, transitioning the communication link from the low power mode (e.g., the low power idle (LPI) mode of EEE) to the normal mode prior to the future time permits transmission of a time-sensitive packet without incurring the variable delay of EEE discussed above.

Figure 1:
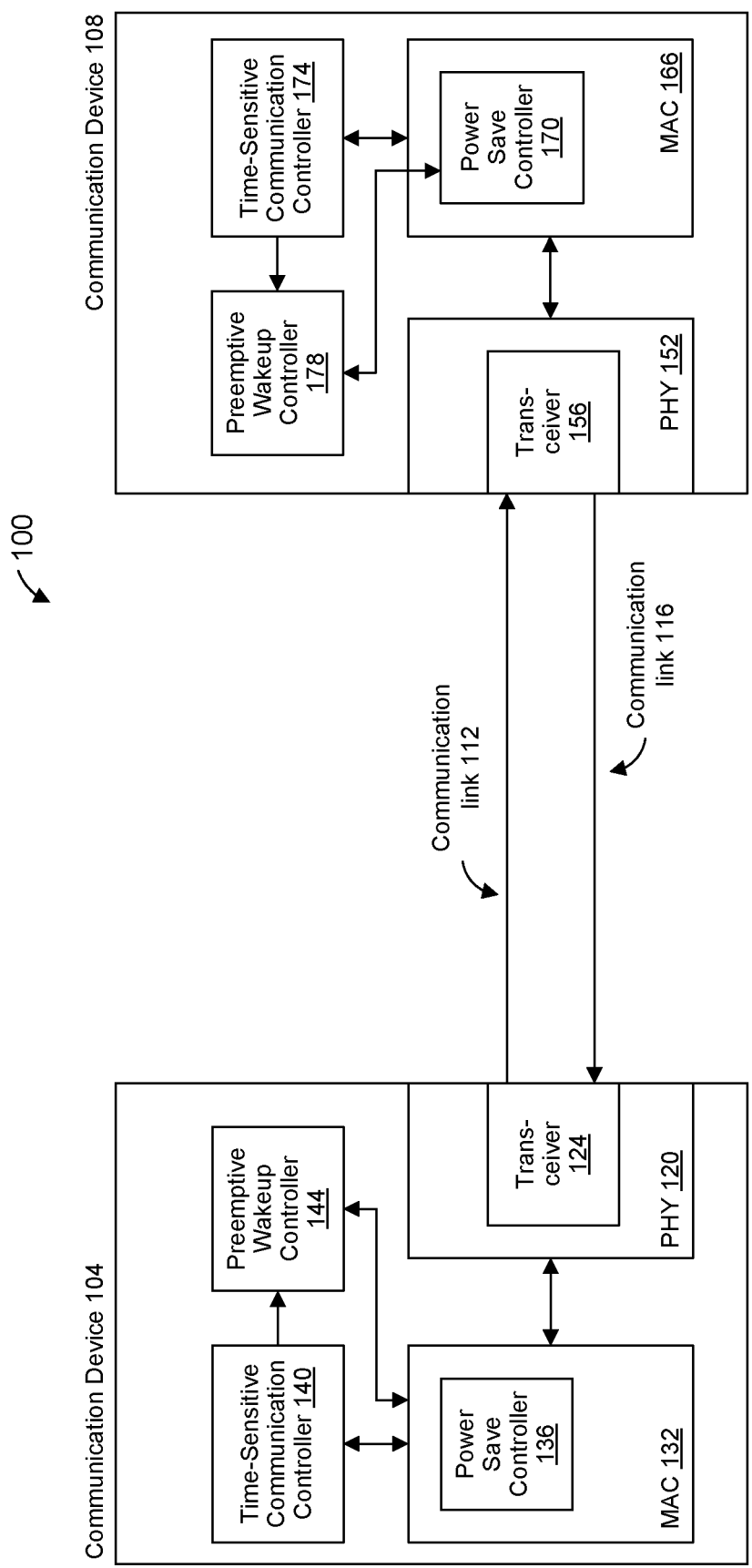
FIG. 1 is a simplified diagram of an example communication system in which a communication link is transitioned from a low power mode to a normal mode prior to a time-sensitive communication, according to an embodiment.

FIG. 1 is a simplified diagram of an example communication system 100, according to an embodiment. The communication system 100 includes a communication device 104 communicatively coupled to a communication device 108 via a communication link 112 and a communication link 116. The communication link 112 is for transmitting from the communication device 104 to the communication device 108, and the communication link 116 is for transmitting from the communication device 108 to the communication device 104.

In an embodiment, the communication link 112 and the communication link 116 correspond to one or more twisted copper wire pairs. In other embodiments, the communication link 112 and the communication link 116 corresponding to another suitable communication medium such as coaxial cable, an optical cable, a wireless communication link, etc.

The communication device 104 comprises physical layer (PHY) circuitry 120 that is configured to perform PHY actions corresponding to a PHY entity defined by a communication protocol, such as the IEEE 802.3 Standard. The PHY circuitry 120 includes a transceiver 124 that is configured to transmit via the communication link 112 and to receive via the communication link 116.

The PHY circuitry 120 is configured to operate the communication link 112 and the communication link 116 i) in a normal mode in which packets are communicated via the communication link normally, and ii) a low power mode in which circuitry of the transceiver 124 is put into a configuration in which power consumption by the PHY circuitry 120 is significantly reduced, i.e., by at least 40%, as compared to when the circuitry is in the normal mode. In an embodiment, each of the communication link 112 and the communication link 116 are controlled separately to transition respectively between the normal mode and the low power mode. For example, the communication link 112 can be in the normal mode when the communication link 116 is in the low power mode, and vice versa.

In an embodiment, the PHY circuitry 120 is configured to operate the communication link 112 and the communication link 116 according to the EEE mechanism. For example, the low power mode corresponds to the low power idle (LPI) mode of operation of EEE. With regard to the communication link 112, during the LPI mode the transceiver 124 operates in a repeating quiet-refresh cycle in which the transceiver 124 transmits nothing during periodic time periods (referred to as "quiet time periods"), and transmits refresh symbols during other periodic time periods (referred to as "refresh time periods"). Because nothing is transmitted during the quiet time periods, transmitter circuitry of the transceiver 124 is put to sleep and therefore power consumption is reduced at the transceiver 124. With regard to the communication link 116, during the LPI mode receiver circuitry of the transceiver 124 is put to sleep during the quiet time periods to reduce power consumption. Reception of refresh symbols during the refresh time periods permits the receiver circuitry of the transceiver 124 to maintain clock synchronization and to adapt filters (e.g., equalization filters) of the receiver circuitry.

In EEE, the quiet-refresh cycle includes designated time windows (referred to herein as "alert windows") in which a transmitter may transmit a signal (referred to herein as an "alert signal") to alert a receiver that the transmitter will soon transmit a request to exit the LPI mode (referred to herein as a "wake signal"). The transmitter is permitted to transmit the wake signal during any of the alert windows. When in the LPI mode, the receiver powers up to be prepared to receive an alert signal and/or a wake signal in any of the alert windows. The receiver is configured to transition from the LPI mode to the normal mode in response to receiving a wake signal during an alert window.

Thus, when an alert signal or a wake signal is to be transmitted, the transceiver 124 is configured to power up transmit circuitry to transmit the alert signal and/or the wake signal via the communication link 112 during an alert window. Otherwise, the transceiver 124 keeps the transmit circuitry asleep during the quiet time periods, according to an embodiment. Additionally, the transceiver 124 is configured to power up receive circuitry in connection with each alert window so that the transceiver 124 is prepared to receive an alert signal and/or a wake signal during each alert window. Otherwise, the transceiver 124 keeps the receive circuitry asleep in between alert windows during the quiet time periods, according to an embodiment.

The communication device 104 also comprises media access control (MAC) layer circuitry 132 that is configured to perform MAC layer actions corresponding to a MAC entity defined by the communication protocol (e.g., the IEEE 802.3 Standard). The MAC layer circuitry 132 is coupled to the PHY circuitry 120 and is configured to send packets to the PHY circuitry 120 for transmission via the communication link 112. The PHY circuitry 120 then transmits the packets via the communication link 112. Additionally, the PHY circuitry 120 is configured to receive packets via the communication link 116, and to provide the packets to the MAC layer circuitry 132. In an embodiment, the MAC layer circuitry 132 is coupled to the PHY circuitry 120 via a suitable media independent interface. In other embodiments, the MAC layer circuitry 132 is coupled to the PHY circuitry 120 via another suitable interface.

In some embodiments, the MAC layer circuitry 132 is coupled to a host processor (not shown) of the communication device 104. In some such embodiments, the MAC layer circuitry 132 receives packets from the host processor and sends the packets to the PHY circuitry 120 for transmission via the communication link 112; and the MAC layer circuitry 132 receives packets from the PHY circuitry 120, and provides the packets to the host processor, the packets having been received by the PHY circuitry 120 via the communication link 116.

The MAC layer circuitry 132 comprises a power save controller 136 that is configured to control the PHY circuitry 120 to transition the communication link 112 and the communication link 116 between the normal mode and the low power mode. In an embodiment, the power save controller 136 is configured to control the PHY circuitry 120 to transition the communication link 112 and the communication link 116 between the normal mode and the LPI mode according to EEE.

In an embodiment, when the communication link 112 is in the low power mode (e.g., the LPI mode) and in response to the power save controller 136 determining that the MAC layer circuitry 132 has one or more packets that are to be transmitted via the communication link 112, the power save controller 136 controls at least transmit circuitry of the PHY circuitry 120 to transition to the normal mode. In an embodiment, when the communication link 112 is in the normal mode and in response to the power save controller 136 determining that the MAC layer circuitry 132 has not received any packets that are to be transmitted via the communication link 112 for a suitable period of time, the power save controller 136 controls at least transmit circuitry the PHY circuitry 120 to transition to the low power mode (e.g., the LPI mode).

The communication device 104 also comprises a time-sensitive communication controller 140 that is configured to provide time-sensitive packets to the MAC layer circuitry 132 for transmission via the communication link 112. The time-sensitive packets include packets for which a variability in respective transmit delays is to be kept to a suitable minimum variability, the respective delays being between when the packets are provided to the MAC layer circuitry 132 and when the packets are transmitted on the communication link 112, according to an embodiment. The time-sensitive packets additionally or alternatively include packets for which respective transmit delays are to be kept to a suitable minimum time duration, according to another embodiment.

In an embodiment, the time-sensitive communication controller 140 is configured to operate according to the precision time protocol (PTP). For example, the controller 140 is configured to provide PTP sync frames (an example of time-sensitive packets) and/or PTP Pdelay Request frames (another example of time-sensitive packets) to the MAC layer circuitry 132 for transmission via the communication. PTP sync frames are sent by the time-sensitive communication controller 140 for synchronizing clocks of other communication devices in the communication system 100 to a clock of the communication device 104, in an embodiment. PTP Pdelay Request frames are sent by the time-sensitive communication controller 140 for measuring a time delay over at least the communication link 112, in an embodiment.

In an embodiment, the time-sensitive communication controller 140 is configured to provide time-sensitive packets for controlling a component apparatus (e.g., an actuator, a camera, etc.) of a vehicle, industrial equipment, etc. For example, the time-sensitive communication controller 140 includes a camera controller that sends packets, with camera control commands, that are required to be delivered to a camera of the vehicle with a certain time delay in between the packets, according to another embodiment.

In an embodiment, the time-sensitive communication controller 140 is implemented in the host processor (not shown) discussed above. In other embodiments that include the host processor, the time-sensitive communication controller 140 is implemented in another processor (e.g., a packet processor, an example of which is described below) of the communication device 104 that is separate from the host processor.

The communication device 104 also includes a preemptive wakeup controller 144 that is coupled to the time-sensitive communication controller 140 and the MAC layer circuitry 132. The preemptive wakeup controller 144 is configured to determine that the communication link 112 will be used for a time-sensitive communication at a future time and, in response, prompt the power save controller 136 to transition the communication link 112 from the low power mode to the normal mode prior to the future time so that the communication link 112 is in the normal mode when the future time occurs.

In some embodiments, the time-sensitive communication controller 140 is configured to inform the preemptive wakeup controller 144 of the future time at which the communication link 112 will be used for the time-sensitive communication. In some embodiments, the time-sensitive communication controller 140 maintains a schedule of when the communication link 112 will be used for the time-sensitive communications, and the preemptive wakeup controller 144 accesses the schedule to determine future times at which the communication link 112 will be used for the time-sensitive communications. In some embodiments, the preemptive wakeup controller 144 determines, based on the future time, a wakeup time at which the communication link is to be transitioned from the low power mode to the normal mode, the wakeup time occurring before the future time. In some embodiments, the preemptive wakeup controller 144 determines the wakeup time using a predetermined time period that accounts for a maximum time delay for transitioning the communication link from the low power mode to the normal mode. For example, the preemptive wakeup controller 144 determines the wakeup time based on subtracting the predetermined time period from the future time, in an embodiment.

In some embodiments, the preemptive wakeup controller 144 generates control signals and provides the control signals to the power save controller 136 to prompt the power save controller 136 to transition the communication link 112 from the low power mode to the normal mode prior to the future time (e.g., at the determined wakeup time) so that the communication link 112 is in the normal mode when the future time occurs. In some embodiments, the preemptive wakeup controller 144 generates a wakeup packet (to be described below) and provides the wakeup packet to the MAC layer circuitry 132, where the wakeup packet is configured to prompt the power save controller 136 to transition the communication link 112 from the low power mode to the normal mode prior to the future time so that the communication link 112 is in the normal mode when the future time occurs.

As discussed above, with a power saving mechanism such as EEE, when the communication link 112 is in the low power mode, there will be a variable delay between when a packet is received by the MAC layer circuitry 132 and when the communication link 112 is transitioned to the normal mode and ready to transmit the packet. Thus, if the time-sensitive communication controller 140 provides a time-sensitive packet to the MAC layer circuitry 132 while the communication link 112 is in the low power mode, there will be a variable delay between when the time-sensitive packet was provided to the MAC layer circuitry 132 and when the time-sensitive packet is transmitted on the communication link 112. On the other hand, because the preemptive wakeup controller 144 causes the communication link 112 to transition to the normal mode prior to when a time-sensitive packet is to be transmitted, the communication link 112 will already be in the normal mode when the MAC layer circuitry 132 receives the time-sensitive packet and thus the variable delay discussed above is avoided.

The communication device 108 comprises PHY circuitry 152 that is configured to perform PHY actions corresponding to a PHY entity defined by the communication protocol (e.g., the IEEE 802.3 Standard). The PHY circuitry 152 includes a transceiver 156 that is configured to transmit via the communication link 116 and to receive via the communication link 112.

The PHY circuitry 152 is configured to operate the communication link 112 and the communication link 116 i) in the normal mode in which packets are communicated via the communication link normally, and ii) the low power mode in which circuitry of the transceiver 156 is put into a configuration in which power consumption by the PHY circuitry 152 is significantly reduced, i.e., by at least 40%, as compared to when the circuitry is in the normal mode.

In an embodiment, the PHY circuitry 152 is configured to operate the communication link 112 and the communication link 116 according to the EEE mechanism. In such embodiments, when an alert signal or a wake signal is to be transmitted, the transceiver 156 is configured to power up transmit circuitry to transmit the alert signal and/or the wake signal via the communication link 116 during an alert window. Otherwise, the transceiver 156 keeps the transmit circuitry asleep during the quiet time periods, according to an embodiment. Additionally, the transceiver 156 is configured to power up receive circuitry in connection with each alert window so that the transceiver 56 is prepared to receive an alert signal and/or a wake signal during each alert window. Otherwise, the transceiver 156 keeps the receive circuitry asleep in between alert windows during the quiet time periods, according to an embodiment.

The communication device 108 also comprises MAC layer circuitry 166 that is configured to perform MAC layer actions corresponding to a MAC entity defined by the communication protocol (e.g., the IEEE 802.3 Standard). The MAC layer circuitry 166 is coupled to the PHY circuitry 152 and is configured to send packets to the PHY circuitry 152 for transmission via the communication link 116. The PHY circuitry 152 then transmits the packets via the communication link 116. Additionally, the PHY circuitry 152 is configured to receive packets via the communication link 112, and to provide the packets to the MAC layer circuitry 166. In an embodiment, the MAC layer circuitry 166 is coupled to the PHY circuitry 152 via a suitable media independent interface. In other embodiments, the MAC layer circuitry 166 is coupled to the PHY circuitry 152 via another suitable interface.

In some embodiments, the MAC layer circuitry 166 is coupled to a host processor (not shown) of the communication device 108. In some such embodiments, the MAC layer circuitry 166 receives packets from the host processor and sends the packets to the PHY circuitry 152 for transmission via the communication link 116; and the MAC layer circuitry 166 receives packets from the PHY circuitry 152, and provides the packets to the host processor, the packets having been received by the PHY circuitry 152 via the communication link 112.

The MAC layer circuitry 166 comprises a power save controller 170 that is configured to control the PHY circuitry 152 to transition the communication link 112 and the communication link 116 between the normal mode and the low power mode. In an embodiment, the power save controller 170 is configured to control the PHY circuitry 152 to transition the communication link 112 and the communication link 116 between the normal mode and the LPI mode according to EEE.

In an embodiment, when the communication link 116 is in the low power mode (e.g., the LPI mode) and in response to the power save controller 170 determining that the MAC layer circuitry 166 has one or more packets that are to be transmitted via the communication link 116, the power save controller 170 controls at least transmit circuitry of the PHY circuitry 152 to transition to the normal mode. In an embodiment, when the communication link 116 is in the normal mode and in response to the power save controller 170 determining that the MAC layer circuitry 166 has not received any packets that are to be transmitted via the communication link 112 for a suitable period of time, the power save controller 170 controls at least transmit circuitry of the PHY circuitry 152 to transition to the low power mode (e.g., the LPI mode).

The communication device 108 also comprises a time-sensitive communication controller 174 that is configured to provide time-sensitive packets to the MAC layer circuitry 166 for transmission via the communication link 116. In an embodiment, the time-sensitive communication controller 174 is configured to operate according to the PTP. In an embodiment, the time-sensitive communication controller 174 is configured to provide time-sensitive packets for controlling a component apparatus (e.g., an actuator, a camera, etc.) of a vehicle, industrial equipment, etc.

In an embodiment, the time-sensitive communication controller 174 is implemented in the host processor (not shown) of the communication device 108 discussed above. In other embodiments in which the communication device 108 includes the host processor, the time-sensitive communication controller 174 is implemented in another processor (e.g., a packet processor, an example of which is described below) of the communication device 108 that is separate from the host processor.

The communication device 108 also includes a preemptive wakeup controller 178 that is coupled to the time-sensitive communication controller 174 and the MAC layer circuitry 166. The preemptive wakeup controller 178 is configured to determine that the communication link 116 will be used for a time-sensitive communication at a future time and, in response, prompt the power save controller 170 to transition the communication link 116 from the low power mode to the normal mode prior to the future time so that the communication link 116 is in the normal mode when the future time occurs.

In some embodiments, the time-sensitive communication controller 174 is configured to inform the preemptive wakeup controller 178 of the future time at which the communication link 116 will be used for the time-sensitive communication. In some embodiments, the time-sensitive communication controller 174 maintains a schedule of when the communication link 116 will be used for the time-sensitive communications, and the preemptive wakeup controller 178 accesses the schedule to determine future times at which the communication link 116 will be used for the time-sensitive communications.

In some embodiments, the preemptive wakeup controller 178 generates control signals and provides the control signals to the power save controller 170 to prompt the power save controller 170 to transition the communication link 116 from the low power mode to the normal mode prior to the future time so that the communication link 116 is in the normal mode when the future time occurs. In some embodiments, the preemptive wakeup controller 178 generates a wakeup packet (to be described below) and provides the wakeup packet to the MAC layer circuitry 166, where the wakeup packet is configured to prompt the power save controller 170 to transition the communication link 116 from the low power mode to the normal mode prior to the future time so that the communication link 116 is in the normal mode when the future time occurs.

As discussed above, with a power saving mechanism such as EEE, when the communication link 116 is in the low power mode, there will be a variable delay between when a packet is received by the MAC layer circuitry 166 and when the communication link 116 is transitioned to the normal mode and ready to transmit the packet. Thus, if the time-sensitive communication controller 174 provides a time-sensitive packet to the MAC layer circuitry 166 while the communication link 116 is in the low power mode, there will be a variable delay between when the time-sensitive packet was provided to the MAC layer circuitry 166 and when the time-sensitive packet is transmitted on the communication link 116. On the other hand, because the preemptive wakeup controller 178 causes the communication link 116 to transition to the normal mode prior to when a time-sensitive packet is to be transmitted, the communication link 116 will already be in the normal mode when the MAC layer circuitry 166 receives the time-sensitive packet and thus the variable delay discussed above is avoided.

Figure 2:
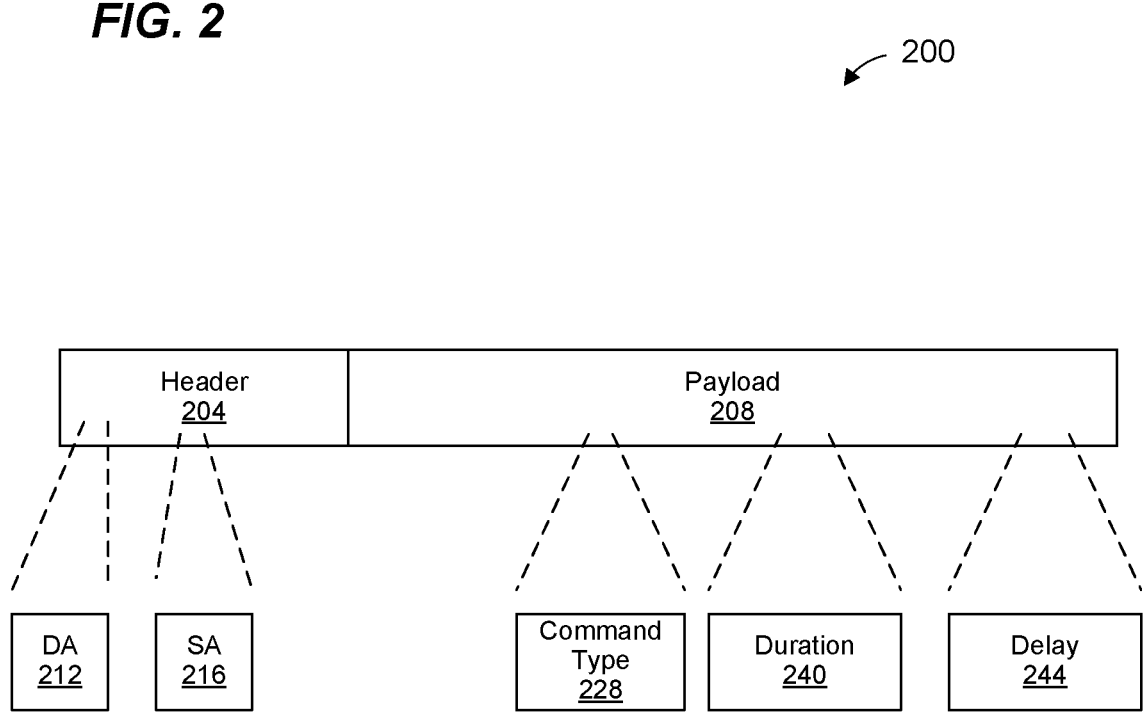
FIG. 2 is a simplified diagram of an example wakeup packet that is used in the communication system of FIG. 1 in connection with transitioning a communication link from a low power mode to a normal mode prior to a time-sensitive communication, according to an embodiment.

FIG. 2 is a simplified diagram of an example wakeup packet 200 that a communication device uses to transition a communication link from a low power mode to a normal mode prior to the communication link being used for a time-sensitive communication, according to an embodiment. In some embodiments, the wakeup packet 200 is used in the communication system 100 of FIG. 1, and FIG. 2 is described with reference to FIG. 1 for explanatory purposes. In other embodiments, the wakeup packet 200 is used in a suitable communication system different than the communication system 100 of FIG. 1. Also, the communication system 100 does not use a wakeup packet like the wakeup packet 200, according to some embodiments.

The wakeup packet 200 includes a header 204 and a payload 208. In an embodiment, the wakeup packet 200 corresponds to a MAC layer (sometimes referred to L2 layer) packet, and the header 204 corresponds to a MAC layer header. The header 204 includes a destination address (DA) field 212 and a source address (SA) field 216. The destination address field 212 includes a network address (e.g., a MAC address) of an intended recipient of the wakeup packet 200, and the source address field 216 includes a network address (e.g., a MAC address) of the communication device that is sending the wakeup packet 200. For example, when the communication device 104 is to send a time-sensitive packet to the communication device 108, the communication device 104 generates (e.g., the preemptive wakeup controller 144 generates) the wakeup packet 200 to include a network address (e.g., a MAC address) of the communication device 108 in the DA field 212 and a network address (e.g., a MAC address) of the communication device 104 in the SA field 216. As will be discussed further below, the DA field 212 is set to a value corresponding to a multicast address or a broadcast address when multiple communication links corresponding to multiple other communication devices are to transition to the normal mode, according to some embodiments.

The payload 208 of the wakeup packet 200 includes a command type field 228 that indicates a command selected from a set of multiple different commands associated with transitioning communication links between a normal mode and a low power mode, according to an embodiment. The multiple different commands include i) a wakeup command corresponding to transitioning one or more communication links from the low power mode to the normal mode, and ii) a nullify command corresponding to canceling a previous wakeup command to allow the one or more communication links to transition back to the low power mode. In other embodiments, the multiple different commands include a set of other suitable commands.

In some embodiments, a format of the payload 208 varies depending on the type of command indicated in the command type field 228. In other embodiments, the format of the payload 208 is the same for all commands indicated in the command type field 228.

In some embodiments, the command type field 228 is omitted and the wakeup packet 200 corresponds only to transitioning one or more communication links from the low power mode to the normal mode.

The payload 208 also includes a duration field 240 that indicates a minimum time duration for which the one or more communication links are to remain in the normal mode. In some embodiments, the duration field 240 is omitted. For example, the wakeup packet 200 itself signals that the one or more communication links are to remain in the normal mode for a predetermined and/or pre-negotiated minimum time duration, in an embodiment. For instance, the minimum time duration is predetermined/fixed and known a priori by the communication devices 104/108, or the communication devices 104/108 negotiate the minimum time duration prior to using the wakeup packet 200.

The payload 208 further includes a delay field 244 that indicates a delay time duration between a time at which a device receives the wakeup packet 200 and ii) a later time at which the device is to transition a communication link from the low power mode to the normal mode. In some embodiments, the delay field 244 is omitted. For example, delaying the time at which the device transitions the communication link is not permitted, in an embodiment. In another embodiment, the wakeup packet 200 itself signals that the transition is to be delayed a predetermined and/or pre-negotiated delay time, in an embodiment. For instance, the delay time is predetermined and fixed, or the communication devices 104/18 negotiate the delay time prior to using the wakeup packet 200.

In some embodiments, one or both of the duration field 240 and the delay field 244 are included in the payload 208 when the command type indicates the wakeup command, and one or both of the duration field 240 and the delay field 244 are omitted from the payload 208 when the command type field 228 indicates the nullify command.

Referring now to FIGS. 1 and 2, in response to the preemptive wakeup controller 144 determining that the communication link 112 and the communication link 116 will be used for time-sensitive communications at a future time, the preemptive wakeup controller 144 generates and provides a first wakeup packet 200 to the MAC layer circuitry 132. The preemptive wakeup controller 144 generates the first wakeup packet 200 with a network address of the communication device 108 in the DA field 212 and with a network address of the communication device 103 in the AA field 216. Additionally, the preemptive wakeup controller 144 with the command type field 228 set to indicate that the first wakeup packet 200 includes a wakeup command corresponding to transitioning one or more communication links from the low power mode to the normal mode. Additionally, the preemptive wakeup controller 144 generates the first wakeup packet 200 to include an indication of a suitable time duration in the duration field 240. Optionally, the preemptive wakeup controller 144 generates the first wakeup packet 200 to include an indication of a suitable delay time duration in the delay field 244.

In response to the MAC layer circuitry 132 receiving the first wakeup packet 200, the power save controller 136 prompts the PHY circuitry 120 to transition the communication link 116 from the low power mode to the normal mode. After the communication link 116 transitions to the normal mode, the transceiver 124 transmits the first wakeup packet 200 to the communication device 108 via the communication link 112.

In some embodiments, the preemptive wakeup controller 144 controls the power save controller 136 to transition the communication link 112 back to the low power mode after the minimum time duration that is indicated in the duration field 240 (or, in some embodiments in which the duration field 240 is omitted, after the minimum time duration that that is predetermined and/or pre-negotiated), at least when there is no other data (e.g., buffered in the MAC processor 132 and/or the PHY circuitry 120) waiting to be transmitted via the communication link 116. In other embodiments, the preemptive wakeup controller 144 allows the power save controller 136 to transition the communication link 112 back to the low power mode after the minimum time duration if and when the power save controller 136 determines that the communication link 112 should transition back to the low power mode.

The PHY circuitry 152 receives the first wakeup packet 200 and provides the first wakeup packet 200 to the MAC circuitry 166. The MAC circuitry 166 analyzes the header 204 (e.g., the DA field 212) of the first wakeup packet 200 and determines that the communication device 108 is the intended recipient of the first wakeup packet 200. The MAC circuitry 166 (or the host processor (not shown), or other suitable circuitry of the communication device 108) provides the first wakeup packet 200 to the preemptive wakeup controller 178. The preemptive wakeup controller 178 receives the first wakeup packet 200 and analyzes the command type field 228 to determine that the first wakeup packet 200 includes a wakeup command. Additionally, the preemptive wakeup controller 178 determines, based on the DA field 212 and the SA field 216, that the wakeup command corresponds to transitioning the communication link 116 from the low power mode to the normal mode. The preemptive wakeup controller 178 further determines a time duration for which the communication link 116 is to remain in the normal mode based on the duration field 240 in the first wakeup packet 200. Then, in response to receiving the first wakeup packet 200, the preemptive wakeup controller 178 prompts the power save controller 170 to transition the communication link 116 from the low power mode to the normal mode. Additionally, the preemptive wakeup controller 178 controls the power save controller 170 to keep the communication link 116 in the normal mode for the time duration indicated by the duration field 240 in the first wakeup packet 200. In some embodiments in which the duration field 240 is omitted, the preemptive wakeup controller 178 controls the power save controller 170 to keep the communication link 116 in the normal mode for a minimum time duration that is predetermined and/or pre-negotiated by the communication devices 104, 108.

If the first wakeup packet 200 includes the delay field 244, the preemptive wakeup controller 178 controls the power save controller 170 to transition the communication link 116 from the low power mode to the normal mode after a delay time period indicated by the delay field 244, according to an embodiment.

In an embodiment, if the preemptive wakeup controller 144 determines that the time sensitive communication(s) on the communication link 112 and/or the communication link 116 that prompted the first wakeup packet 200 are completed prior to the time duration indicated in the first wakeup packet 200 having expired, the preemptive wakeup controller 144 optionally generates and provides a second wakeup packet 200 to the MAC circuitry 132. The preemptive wakeup controller 144 generates the second wakeup packet 200 with the network address of the communication device 108 in the DA field 212 and with the network address of the communication device 103 in the AA field 216. Additionally, the preemptive wakeup controller 144 generates the second wakeup packet 200 with the command type field 228 set to indicate that the wakeup packet 200 includes a nullify command corresponding to canceling the wakeup command in the previous first wakeup packet 200.

In response to the MAC layer circuitry 132 receiving the second wakeup packet 200, the transceiver 124 transmits the second wakeup packet 200 to the communication device 108 via the communication link 112. After the transceiver 124 transmits the second wakeup packet 200, the power save controller 136 prompts the PHY circuitry 120 to transition the communication link 116 from the normal mode to the low power mode.

In some embodiments, the preemptive wakeup controller 178 controls the power save controller 170 to transition the communication link 116 back to the low power mode after the minimum time duration that is indicated in the duration field 240 (or, in some embodiments in which the duration field 240 is omitted, after the minimum time duration that that is predetermined and/or pre-negotiated), at least when there is no other data (e.g., buffered in the MAC processor 132 and/or the PHY circuitry 120) waiting to be transmitted via the communication link 116. In other embodiments, the preemptive wakeup controller 178 allows the power save controller 170 to transition the communication link 116 back to the low power mode after the minimum time duration if and when the power save controller 170 determines that the communication link 116 should transition back to the low power mode.

The PHY circuitry 152 receives the second wakeup packet 200 and provides the second wakeup packet 200 to the MAC circuitry 166. The MAC circuitry 166 analyzes the header 204 (e.g., the DA field 212) of the second wakeup packet 200 and determines that the communication device 108 is the intended recipient of the second wakeup packet 200. The MAC circuitry 166 (or the host processor (not shown), or other suitable circuitry of the communication device 108) provides the second wakeup packet 200 to the preemptive wakeup controller 178. The preemptive wakeup controller 178 receives the second wakeup packet 200 and analyzes the command type field 228 to determine that the wakeup packet 200 includes a nullify command. Additionally, the preemptive wakeup controller 178 determines, based on the DA field 212 and the SA field 216, that the nullify command corresponds to transitioning the communication link 116 from the normal mode to the low power mode prior to the time duration indicated in the first wakeup packet 200 has expired. Then, in response to receiving the second wakeup packet 200, the preemptive wakeup controller 178 prompts the power save controller 170 to transition the communication link 116 from the normal mode to the low power mode prior to the time duration indicated in the first wakeup packet 200 expiring.

As briefly discussed above, the preemptive wakeup controller 144 generates the wakeup packet 200 with the DA field 212 set to a value corresponding to a multicast address or a broadcast address when multiple communication links corresponding to multiple other communication devices are to transition to the normal mode, according to some embodiments. For instance, when the DA field 212 is set to a multicast/broadcast value, the wakeup packet 200 is propagated through a communication network, prompting multiple communication links to transition to the normal mode, according to some embodiments. If all communication links of a communication network are to transition to the normal mode, the preemptive wakeup controller 144 sets the DA field 212 to a broadcast address, and if communication links of only a section of the communication network are to transition to the normal mode, the preemptive wakeup controller 144 sets the DA field 212 to a multicast address that corresponds to the section of the communication network, according to an embodiment. When the preemptive wakeup controller 144 sets the DA field 212 to a unicast address, communication links along a path in the communication network to a network device having the unicast address are transitioned to the normal mode, according to an embodiment.

Figure 3:
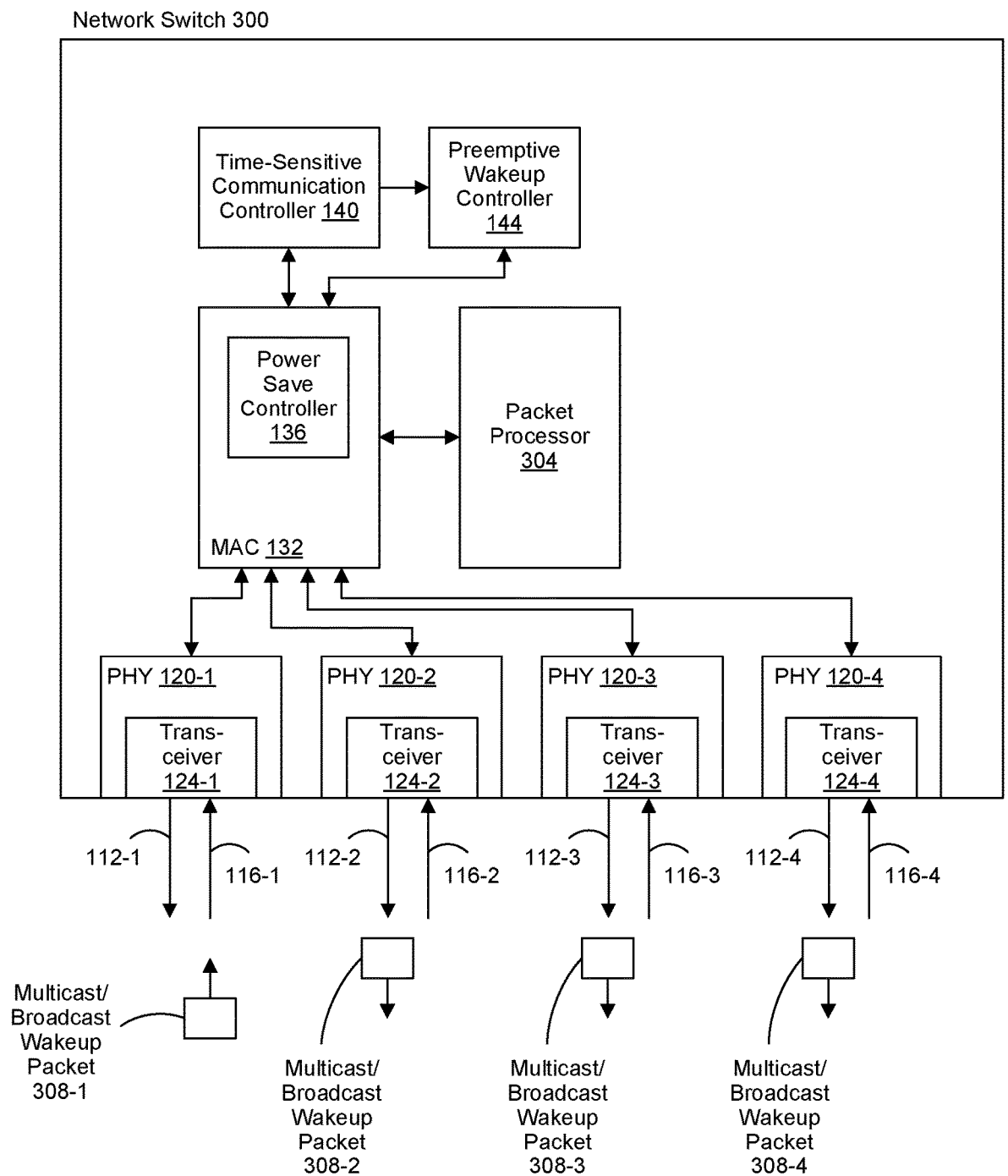
FIG. 3 is a simplified diagram of an example network switch that is configured to transition a communication link from a low power mode to a normal mode prior to a time-sensitive communication, according to an embodiment.

FIG. 3 is a simplified diagram of an example network switch 300, according to an embodiment. The network switch 300 includes many of the same or similar components as the communication device 104 and the communication device 108 of FIG. 1, and like-numbered elements are not described again in detail for purposes of brevity. Additionally, the network switch 300 is configured to generate and process wakeup packets such as the example wakeup packet of FIG. 2, according to some embodiments, and FIG. 3 is described with reference to FIG. 2 for explanatory reasons. In other embodiments, the network switch 300 is configured to generate and process other suitable wakeup packets that are different than the wakeup packet 200 of FIG. 2.

The network switch 300 includes multiple instances of the PHY circuitry 120 coupled to respective communication links 112/116. Each communication link 112 is for transmitting from the network switch 300 to another respective communication device (e.g., another network switch, a communication device like the communication device 104/108, etc.), and each communication link 116 is for receiving from the other respective communication device. Each instance of PHY circuitry 120 corresponds to a respective port of the network switch 300.

The PHY circuitry 120 are coupled to the MAC circuitry 132. Although one instance of the MAC circuitry 132 is illustrated in FIG. 3, in other embodiments the network switch 300 includes multiple instances of the MAC circuitry 132 coupled to respective sets of one or more PHY circuitry 120.

The network switch 300 includes a packet processor 304 that is configured to process header information in packets received via the communication links 112 to determine communication links 116 via which the packet is to be forwarded. In an embodiment, the packet processor 304 includes a forwarding database (not shown) that stores forwarding information comprising associations between network addresses and ports of the network switch 300. The packet processor 304 uses i) network address information in a header of a received packet (e.g., DA information), and ii) forwarding information in the forwarding database that corresponds to the network address in the received packet, to determine one or more ports via which the packet is to be transmitted.

FIG. 3 illustrates an example in which the network device 300 receives a wakeup packet 308 via the communication link 116-1, and the wakeup packet has the DA field 212 set to a multicast or broadcast value. Additionally, the command type field 228 is set to indicate that wakeup packet includes a wakeup command corresponding to transitioning one or more communication links from the low power mode to the normal mode. In response to receiving the wakeup packet 308 via the communication link 116-1, the network switch 300 transitions the communication link 112-1 to the normal mode in a manner the same as or similar to actions described above with reference to FIG. 1.

Additionally, the MAC circuitry 132 forwards the wakeup packet 308 to the packet processor 304. The packet processor 304 analyzes header information in the wakeup packet 308 and determines, at least based on the DA field 212 and forwarding information in the forwarding database, that the wakeup packet 308 is to be transmitted via one or more ports of the network switch 300. If the wakeup packet 308 is to be transmitted via more than one port, the packet processor 304 generates one or more additional instances of the wakeup packet 308.

The packet processor 304 provides one or more instances of the wakeup packet 308 to the MAC circuitry 132 along with information that specifies the communication links 116 via which the one or more instances of the wakeup packet 308 are to be transmitted. In an embodiment, the MAC circuitry 132 receiving the one or more instances of the wakeup packet 308 prompts the power save controller 136 to transition the one or more specified communication links 116 to the normal mode. In another embodiment, the preemptive wakeup controller 144 receives the information that specifies the communication links 116 via which the one or more instances of the wakeup packet 308 are to be transmitted, and in response the preemptive wakeup controller 144 prompts the power save controller 136 to transition the one or more specified communication links 116 to the normal mode. In embodiments in which the wakeup packet 308 includes duration information, the preemptive wakeup controller 144 controls the power save controller 136 to keep the one or more specified communication links 116 in the normal mode for a time duration indicated by the wakeup packet 308.

Additionally, the MAC circuitry 132 provides the one or more instances of the wakeup packet 308 to appropriate ones of the PHY circuitry 120, and after the specified communication links 116 have transitioned to the normal mode, the ones of the PHY circuitry 120 transmit the wakeup packet 308 via the specified communication links 116.

In response to receiving a subsequent wakeup packet that includes a nullify command, the network switch 308 forwards the subsequent wakeup packet with the nullify command via one or more ports in a similar manner. Additionally, after forwarding the subsequent wakeup packet via the one or more ports, the preemptive wakeup controller 144 prompts the power save controller 136 to transition the one or more specified communication links 116 to the power save mode, similar to the acts described with reference to FIGS. 1 and 2.

The network switch 300 acts similarly in response to receiving a wakeup packet with a unicast address in the DA field 212, but forwards the wakeup packet to at most one port that corresponds to the unicast address.

Figure 4:
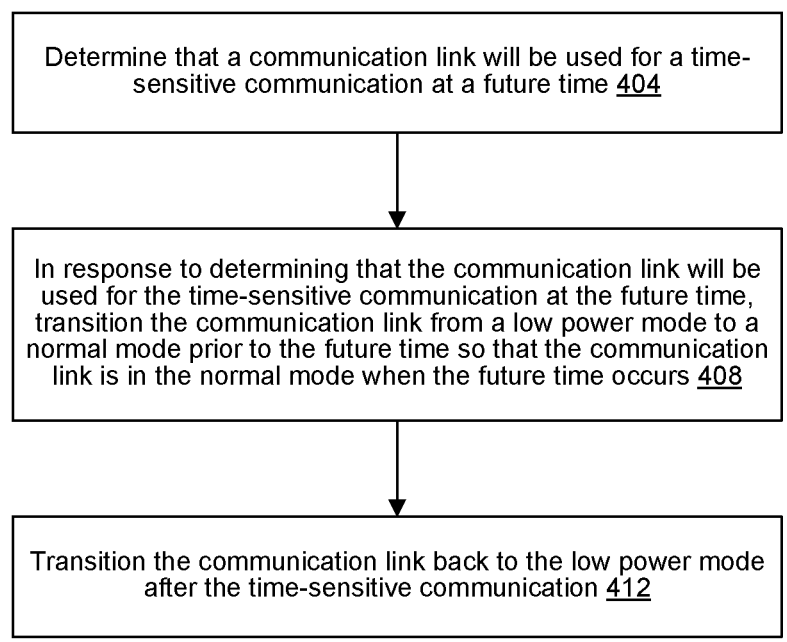
FIG. 4 is a flow diagram of an example method of operation in a communication network that is used for time-sensitive communications, according to an embodiment.

FIG. 4 is a flow diagram of an example method 400 of operation in a communication network that is used for time-sensitive communications, according to an embodiment. The method 400 is implemented by a network device that comprises a transceiver configured to i) communicate via a communication link, and ii) selectively operate the communication link a) in a normal mode for communicating packets via the communication link, and b) in a low power mode that reduces power consumption of the transceiver as compared to the normal mode. In various embodiments, the method 400 is implemented by the communication device 104, the communication device 108, and/or the network switch 300 of FIGS. 1 and 3, and the method 400 is described with reference to FIGS. 1 and 3 for explanatory purposes. In other embodiments, the method 400 is implemented by another suitable network device different than the communication device 104, the communication device 108, and the network switch 300.

In some embodiments, the method 400 involves communicating a wakeup packet such as the wakeup packet 200 of FIG. 2, and the method 400 is described with reference to FIG. 2 for explanatory purposes. In other embodiments, the method 400 is implemented without communicating a wakeup packet or involves communicating a suitable wakeup packet different than the wakeup packet 200 of FIG. 2.

At block 404, the communication device determines that the communication link will be used for a time-sensitive communication at a future time. For example, the preemptive wakeup controller 144 determines that the communication link 112 will be used for the time-sensitive communication at a future time, in an embodiment. As another example, the preemptive wakeup controller 178 determines that the communication link 116 will be used for the time-sensitive communication at the future time, in an embodiment.

In an embodiment, time-sensitive communications occur according to a schedule, and the communication device determines that the communication link will be used for the time-sensitive communication at the future time using scheduling information that indicates the schedule, the scheduling information stored in a memory of the communication device. In another embodiment, a controller (e.g., the time-sensitive communication controller 140, the time-sensitive communication controller 174, etc.) of the communication device that manages time-sensitive communications for the communication device generates an indicator that the time-sensitive communication will occur at the future time, and the communication device determines that the communication link will be used for the time-sensitive communication at the future time using the indicator generated by the controller.

In another embodiment, the network device receives a packet (e.g., a wakeup packet such as the wakeup packet 200 or another suitable wakeup packet) that indicates the communication link will be used for the time-sensitive communication at the future time, and the communication device determines that the communication link will be used for the time-sensitive communication at the future time in response to the communication device receiving the packet.

At block 408, in response to determining at block 404 that the communication link will be used for the time-sensitive communication at the future time, the communication device transitions the communication link from the low power mode to the normal mode prior to the future time so that the communication link is in the normal mode when the future time occurs. For example, the preemptive wakeup controller 144 prompts the power save controller 136 to transition the communication link 112 from the low power mode to the normal mode prior to the future time, in an embodiment. As another example, the preemptive wakeup controller 178 prompts the power save controller 170 to transition the communication link 116 from the low power mode to the normal mode prior to the future time, in an embodiment.

In some embodiment, the method 400 further comprises: determining, by the communication device, a wakeup time at which the communication link is to be transitioned from the low power mode to the normal mode, the wakeup time occurring before the future time; wherein transitioning the communication link from the low power mode to the normal mode at block 408 comprises transitioning the communication link from the low power mode to the normal mode at the wakeup time.

In some embodiments, the method 400 further comprises determining a time duration for which the communication link will remain in the normal mode in connection with the time-sensitive communication; and keeping the communication link in the normal mode for the determined time duration.

In some embodiments, the method 400 further comprises generating, at the communication device, a packet that indicates another communication link will be used for a time-sensitive communication at a future time; and transmitting, by the communication device, the packet via the communication link after transitioning the communication link to the normal mode at block 408.

In an embodiment, the method 400 comprises keeping the communication link in the normal mode for a minimum time period after transitioning the communication link to the normal mode at block 408.

At block 412, the communication device transitions the communication link back to the low power mode after the time-sensitive communication is completed. In an embodiment, transitioning the communication link back to the low power mode at block 412 comprises transitioning the communication link back to the low power mode after the minimum time period. In an embodiment, transitioning the communication link back to the low power mode at block 412 comprises transitioning the communication link back to the low power mode in response to determining that the minimum time period has ended.

For example, the preemptive wakeup controller 144 prompts the power save controller 136 to transition the communication link 112 back to the low power mode after the time-sensitive communication is completed, in an embodiment. As another example, the preemptive wakeup controller 178 prompts the power save controller 170 to transition the communication link 116 back to the low power mode after the time-sensitive communication is completed, in an embodiment.

In some embodiments, the method 400 further comprises receiving, at the communication device, a packet that indicates the communication link and one or more other communication links will be used for the time-sensitive communication at the future time; transitioning the one or more other communication links from the low power mode to the normal mode in response to receiving the packet, and forwarding, by the communication device, the packet via the one or more other communication links after transitioning the one or communication links to the normal mode.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A communication device for communicating in a communication network, the communication device comprising:
   a transceiver configured to i) communicate via a communication link, and ii) selectively operate the communication link a) in a normal mode for communicating packets via the communication link, and b) in a low power mode that reduces power consumption of the transceiver as compared to the normal mode; and
   a controller configured to i) determine that the communication link will be used for a time-sensitive communication at a future time, and ii) in response to determining that the communication link will be used for the time-sensitive communication at the future time, transition the communication link from the low power mode to the normal mode prior to the future time so that the communication link is in the normal mode when the future time occurs.

2. The communication device of claim 1, wherein the controller is a first controller, and wherein the communication device further comprises:
   a second controller that is configured to control the transceiver to i) selectively operate the communication link a) in the normal mode for communicating packets via the communication link, and b) in the low power mode that reduces power consumption of the transceiver as compared to the normal mode;
   wherein the first controller is configured to, in response to determining that the communication link will be used for the time-sensitive communication at the future time, prompt the second controller to transition the communication link from the low power mode to the normal mode prior to the future time so that the communication link is in the normal mode when the future time occurs.

3. The communication device of claim 1, wherein the controller is configured to:
   determine a wakeup time at which the communication link is to be transitioned from the low power mode to the normal mode, the wakeup time occurring before the future time; and
   transition the communication link from the low power mode to the normal mode at the wakeup time.

4. The communication device of claim 1, wherein the controller is configured to:
   determine a time duration for which the communication link is to remain in the normal mode after transitioning from the low power mode to the normal mode; and
   keep the communication link in the normal mode for the time duration after the communication link transitions from the low power mode to the normal mode.

5. The communication device of claim 4, wherein the controller is configured to:
   transition the communication link back to the low power mode after the time duration.

6. The communication device of claim 4, wherein the controller is configured to:
   determine that the time-sensitive communication occurred prior to an end of the time duration; and
   in response to determining that the time-sensitive communication occurred prior to the end of the time duration, transition the communication link from the normal mode to the low power mode prior to the end of the time duration.

7. The communication device of claim 1, wherein the controller is configured to:
   receive a packet that indicates the communication link will be used for the time-sensitive communication at the future time, wherein the packet is separate from the time-sensitive communication; and
   determine that the communication link will be used for the time-sensitive communication at the future time in response to receiving the packet.

8. The communication device of claim 7, wherein:
   the communication link is a first communication link; and
   the controller is configured to receive the packet from another communication device via a second communication link between the communication device and the other communication device.

9. The communication device of claim 8, wherein the controller is configured to:
   determine, based on timing information included in the packet, a time duration for which the first communication link is to remain in the normal mode after transitioning from the low power mode to the normal mode; and
   keep the first communication link in the normal mode for the time duration after transitioning from the low power mode to the normal mode.

10. The communication device of claim 9, wherein the packet is a first packet, and wherein the controller is configured to:
    receive a second packet from the other communication device via the second communication link, the second packet indicating that the first communication link is to transition to the low power mode prior to an end of the time duration; and
    in response to receiving the second packet, transition the first communication link from the normal mode to the low power mode prior to the end of the time duration.

11. The communication device of claim 8, further comprising:
    a packet processor that is configured to process header information in packets received by the communication device to make forwarding decisions regarding the packets; and
    circuitry that is configured to, when the packet processor determines that the packet that indicates the first communication link will be used for the time-sensitive communication is to be forwarded via the first communication link, transmit the packet via the first communication link after transitioning the first communication link to the normal mode.

12. A method of operation in a communication network that is used for time-sensitive communications, the method comprising:
    determining, at a communication device, that a communication link will be used for a time-sensitive communication at a future time; and
    in response to determining that the communication link will be used for the time-sensitive communication at the future time, transitioning, by the communication device, the communication link from a low power mode to a normal mode prior to the future time so that the communication link is in the normal mode when the future time occurs, wherein the normal mode is for communicating packets via the communication link, and the low power mode reduces power consumption of the communication device as compared to the normal mode.

13. The method of operation in the communication network of claim 12, wherein:
determining that the communication link will be used for the time-sensitive communication at the future time comprises determining, at a first controller of the communication device, that the communication link will be used for the time-sensitive communication at the future time; and
transitioning the communication link from the low power mode to the normal mode prior to the future time comprises, prompting, by the first controller, a second controller of the communication device to transition the communication link from the low power mode to the normal mode prior to the future time so that the communication link is in the normal mode when the future time occurs.

14. The method of operation in the communication network of claim 12, further comprising:
determining, by the communication device, a wakeup time at which the communication link is to be transitioned from the low power mode to the normal mode, the wakeup time occurring before the future time; and
transitioning the communication link from the low power mode to the normal mode prior to the future time comprises transitioning the communication link from the low power mode to the normal mode at the wakeup time.

15. The method of operation in the communication network of claim 12, further comprising:
determining, by the communication device, a time duration for which the communication link is to remain in the normal mode after transitioning from the low power mode to the normal mode; and
keeping, by the communication device, the communication link in the normal mode for the time duration after the communication link transitions from the low power mode to the normal mode.

16. The method of operation in the communication network of claim 15, further comprising:
transitioning, by the communication device, the communication link back to the low power mode after the time duration.

17. The method of operation in the communication network of claim 15, further comprising:
determining, by the communication device, that the time-sensitive communication occurred prior to an end of the time duration; and
in response to determining that the time-sensitive communication occurred prior to the end of the time duration, transitioning, by the communication device, the communication link from the normal mode to the low power mode prior to the end of the time duration.

18. The method of operation in the communication network of claim 12, further comprising:
receiving, at the communication device, a packet that indicates the communication link will be used for the time-sensitive communication at the future time, wherein the packet is separate from the time-sensitive communication; and
wherein determining that the communication link will be used for the time-sensitive communication at the future time is in response to receiving the packet.

19. The method of operation in the communication network of claim 18, wherein:
the communication link is a first communication link; and
receiving the packet comprising receiving the packet from another communication device via a second communication link between the communication device and the other communication device.

20. The method of operation in the communication network of claim 19, further comprising:
determining, at the communication device and based on timing information included in the packet, a time duration for which the first communication link is to remain in the normal mode after transitioning from the low power mode to the normal mode; and
keeping, by the communication device, the first communication link in the normal mode for the time duration after transitioning from the low power mode to the normal mode.

21. The method of operation in the communication network of claim 20, wherein the packet is a first packet, and wherein the method further comprises:
receiving, at the communication device, a second packet from the other communication device via the second communication link, the second packet indicating that the first communication link is to transition to the low power mode prior to an end of the time duration; and
in response to receiving the second packet, transitioning, by the communication device, the first communication link from the normal mode to the low power mode prior to the end of the time duration.

22. The method of operation in the communication network of claim 19, further comprising:
determining, at a packet processor of the communication device, that the packet that indicates the first communication link will be used for the time-sensitive communication is to be forwarded via the first communication link; and
transmitting, by the communication device, the packet via the first communication link after transitioning the first communication link to the normal mode.

* * * * *